United States Patent
Chen et al.

(10) Patent No.: US 9,146,349 B2
(45) Date of Patent: Sep. 29, 2015

(54) MONOLITHIC INTEGRATION OF DIELECTRIC WAVEGUIDES AND GERMANIUM-BASED DEVICES

(75) Inventors: Long Chen, North Brunswick, NJ (US); Christopher Doerr, Middletown, NJ (US); Young-Kai Chen, Berkeley Heights, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 1017 days.

(21) Appl. No.: 13/077,086

(22) Filed: Mar. 31, 2011

(65) Prior Publication Data

US 2012/0251034 A1    Oct. 4, 2012

(51) Int. Cl.
  *G02B 6/12*    (2006.01)
  *G02B 6/122*   (2006.01)
  *G02B 6/42*    (2006.01)
  *G02B 6/43*    (2006.01)

(52) U.S. Cl.
  CPC ............ *G02B 6/12004* (2013.01); *G02B 6/122* (2013.01); *G02B 6/42* (2013.01); *G02B 6/43* (2013.01); *G02B 2006/1208* (2013.01); *G02B 2006/12061* (2013.01)

(58) Field of Classification Search
  CPC ........ G02B 6/12004; G02B 6/43; G02B 6/42; G02B 2006/12061; G02B 2006/1208
  USPC ............. 385/14; 257/E21.001; 438/31
  See application file for complete search history.

(56) References Cited

U.S. PATENT DOCUMENTS

| | | | |
|---|---|---|---|
| 6,310,995 B1 * | 10/2001 | Saini et al. | 385/28 |
| 6,594,409 B2 * | 7/2003 | Dutt et al. | 385/14 |
| 7,095,938 B2 * | 8/2006 | Tolstikhin | 385/131 |
| 7,262,140 B2 * | 8/2007 | Brask et al. | 438/725 |
| 7,515,793 B2 * | 4/2009 | Dehlinger et al. | 385/40 |
| 7,811,844 B2 * | 10/2010 | Carothers et al. | 438/31 |
| 8,121,446 B2 * | 2/2012 | Zheng et al. | 385/14 |
| 8,508,008 B2 * | 8/2013 | Griebenow et al. | 257/431 |
| 2002/0154847 A1 * | 10/2002 | Dutt et al. | 385/14 |
| 2004/0258348 A1 * | 12/2004 | Deliwala | 385/14 |
| 2008/0193076 A1 * | 8/2008 | Witzens et al. | 385/14 |
| 2009/0090925 A1 * | 4/2009 | Saito et al. | 257/98 |
| 2010/0330727 A1 * | 12/2010 | Hill et al. | 438/69 |
| 2011/0007761 A1 * | 1/2011 | Assefa et al. | 372/34 |
| 2011/0069925 A1 * | 3/2011 | Zheng et al. | 385/14 |
| 2011/0133063 A1 * | 6/2011 | Ji et al. | 250/227.24 |
| 2011/0293216 A1 * | 12/2011 | Lipson et al. | 385/14 |
| 2012/0095711 A1 * | 4/2012 | Foster et al. | 702/67 |
| 2012/0251034 A1 * | 10/2012 | Chen et al. | 385/14 |

* cited by examiner

*Primary Examiner* — Ryan Lepisto
*Assistant Examiner* — Guy Anderson
(74) *Attorney, Agent, or Firm* — Kramer & Amado, P.C.

(57) ABSTRACT

Various exemplary embodiments relate to an integrated optical device including: a semiconductor waveguide on a substrate; a dielectric waveguide on a substrate optically coupled to the semiconductor waveguide; and a germanium device on the semiconductor waveguide optically coupled to the semiconductor waveguide.

21 Claims, 3 Drawing Sheets

US 9,146,349 B2

MONOLITHIC INTEGRATION OF DIELECTRIC WAVEGUIDES AND GERMANIUM-BASED DEVICES

TECHNICAL FIELD

Various exemplary embodiments disclosed herein relate generally to the monolithic integration of dielectric waveguides and germanium-based devices.

BACKGROUND

Great advances are being made in the optical processing of optical signals. This is leading to the development of optical circuits. Such optical circuits include different optical devices that are used to transmit, receive and process optical signals. Therefore, optical waveguides having low loss and other desirable characteristics may be used to connect different optical devices.

SUMMARY

There is a need for an optical coupling between passive optical circuits and semiconductor-based optical devices such as modulators, photodetectors and switches.

A brief summary of various exemplary embodiments is presented. Some simplifications and omissions may be made in the following summary, which is intended to highlight and introduce some aspects of the various exemplary embodiments, but not to limit the scope of the invention. Detailed descriptions of a preferred exemplary embodiment adequate to allow those of ordinary skill in the art to make and use the inventive concepts will follow in the later sections.

Various exemplary embodiments provide an integrated optical device including: a semiconductor waveguide on a substrate; a dielectric waveguide on a substrate optically coupled to the semiconductor waveguide; and a germanium device on the semiconductor waveguide optically coupled to the semiconductor waveguide.

Various exemplary embodiments further provide a method of forming an integrated optical device comprising: patterning a silicon layer on a silicon-on-insulator (SOI) wafer; forming a dielectric waveguide on a substrate optically coupled to the silicon layer; and forming a germanium device on the silicon layer optically coupled to the silicon layer.

Various embodiments may be further adapted wherein the semiconductor waveguide is single crystal silicon.

Various embodiments may further include a planarization layer on the substrate, wherein the planarization layer has a thickness approximately the same as a thickness of the semiconductor waveguide and wherein the dielectric waveguide overlaps the planarization layer and a portion of the semiconductor waveguide.

Various embodiments may further include a spacing layer between the dielectric waveguide and the planarization layer and between the dielectric waveguide and the semiconductor waveguide.

Various embodiments may be further adapted wherein the spacing layer is part of the planarization layer.

Various embodiments may be further adapted wherein the silicon substrate, the buried insulating layer, and the semiconductor waveguide comprise a silicon-on-insulator (SOI) wafer.

Various embodiments may be further adapted wherein germanium device is a photodetector, a modulator, or a switch.

Various embodiments may be further adapted wherein the dielectric waveguide is coupled to a passive photonic circuit.

Various embodiments may be further adapted wherein dielectric waveguide is one of silica, SiON, $Si_3N_4$, and benzocyclobutene.

Various embodiments may further include forming a planarization layer on the SOI wafer after patterning the silicon layer, wherein the planarization layer has a thickness approximately the same as a thickness of the silicon layer and wherein the dielectric waveguide overlaps the planarization layer and a portion of the silicon layer.

BRIEF DESCRIPTION OF THE DRAWINGS

In order to better understand various exemplary embodiments, reference is made to the accompanying drawings, wherein.

DETAILED DESCRIPTION

Figure 1:
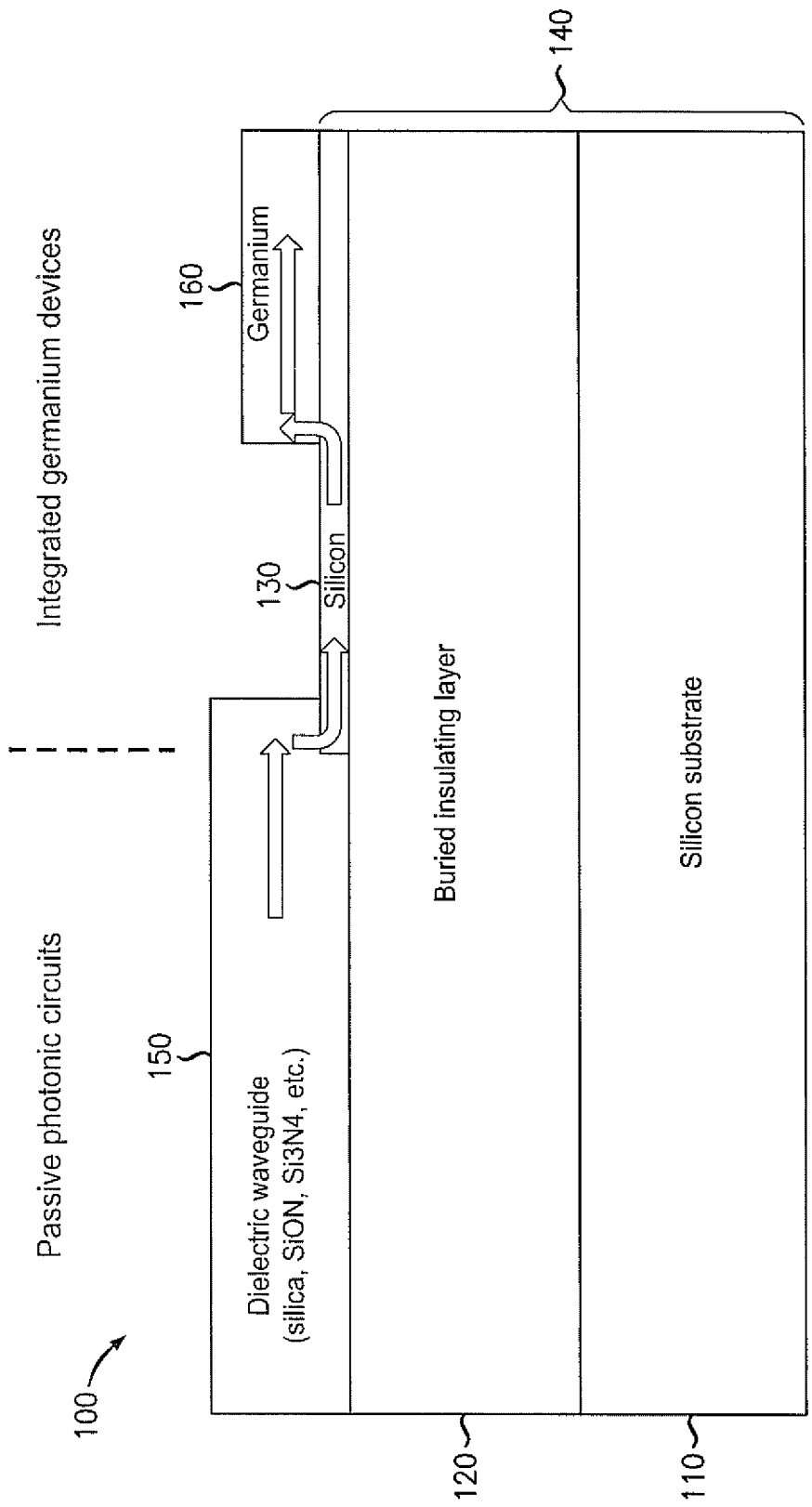
FIG. 1 illustrates a cross-sectional view of an embodiment of a monolithic integrated optical device including a dielectric optical waveguide coupled to a germanium-based device.

Referring now to the drawings, in which like numerals refer to like components or steps, there are disclosed broad aspects of various exemplary embodiments.

Waveguides made of dielectric materials such as silicon-dioxide, silicon-oxynitride, and silicon-nitride have many advantages compared to waveguides made of semiconductor materials such as silicon and indium-phosphide. These advantages include lower propagation loss, less temperature sensitivity, and better robustness to dimension variations. All of these are critical aspects for photonic functionalities such as filtering, multiplexing/demultiplexing, etc. The success of photonic lightwave circuits (PLC), which are based on silica or silicon-dioxide, serves as a good example of this. However, it is often necessary to put those passive photonic functionalities together with photodetectors, modulators, or other circuits, which are usually semiconductor-based, for complete photonic transceiver circuits. Traditionally, this is done by packaging the passive chip together with separate photodetectors or modulators or arrays of such devices. Monolithically integrating the passive dielectric waveguide circuits with these active devices would allow development of photonic circuits with smaller form-factor, enhanced complexity, and lower cost. Below, a general scheme where passive dielectric waveguides may be monolithically integrated with germanium-based active devices on a single silicon chip is described.

One example of such integration is placing a dielectric waveguide on top of a germanium photodetector. However, there are several problems with this configuration. First, because the dielectric waveguides are processed after the germanium photodetectors or other circuits, the processing temperature has to be below a certain value (for example, 600° C.) to avoid damaging the detectors or other circuits. Secondly, because the waveguides are on top of germanium, they interfere the placement of the metal contacts, which might affect the speed or efficiency of the resulting device. Thirdly, such configuration may not be applicable to other germanium-based devices such as modulators. Therefore, there remains a need for monolithic integrated optical device that overcomes these problems.

FIG. 1 illustrates a cross-sectional view of an embodiment of a monolithic integrated optical device including a dielectric optical waveguide coupled to a germanium-based device. A monolithic integrated optical device 100 may include a substrate 110 made of silicon, a buried insulating layer 120 made of silicon-dioxide, a silicon layer 130, a dielectric waveguide 150, and a germanium-based device 160.

The substrate 110, the buried insulating layer 120, and the silicon layer 130 may form a silicon-on-insulator (SOI) wafer 140. SOI wafers 140 are readily available. The substrate 110 may be made of any materials that provide the necessary structure for the SOI wafer 140. The buried insulating layer may be made of insulating materials other than silicon-dioxide. Such insulating materials may include materials with an index of refraction that is less than the index refraction of the silicon layer 130 and the index of refraction of the dielectric waveguide 150 and that may provide adequate insulation between the silicon layer 130 and the substrate 110, and also adequate optical isolation between the silicon layer 130 and the substrate 110 and between the dielectric waveguide 150 and the substrate 110. Further, the use of an SOI wafer 140 may allow for the silicon layer 130 to be formed in a single crystal structure.

A single crystal silicon layer 130 may have better optical characteristics than a poly-crystalline silicon layer and an amorphous silicon layer. Further, the use of single crystal silicon may lead to better germanium devices 160 that may be formed on the silicon layer 130. Poly-crystalline silicon and amorphous silicon layers 130 may lead to poly-crystalline germanium and amorphous germanium layers that form the basis of the germanium device 160. Thus, the use of poly-crystalline germanium and amorphous germanium layers may lead to decreased performance characteristics of the resulting germanium device 160.

Alternatively, instead of using a SOI wafer 140, the buried insulating layer 120 and the silicon layer 130 may be formed on the substrate 110 at the time that the monolithic integrated optical device 100 is formed. This may be accomplished using well know semiconductor deposition and patterning manufacturing processes. It is noted that the resulting deposited silicon layer 130 would not result in a single crystal silicon layer 130. Thus, this type of manufacturing process would be used when the desired germanium device performance may tolerate the use of amorphous or poly-crystalline germanium.

The silicon layer 130 on the buried insulating layer 120 may be patterned. The patterned silicon layer 130 may have three different regions. The first region may interface with the dielectric waveguide 150. The second region may act as a silicon waveguide. The third region may provide a substrate for the formation of the germanium device 160 as well as acting as a waveguide. Thus, the shape and the size of the silicon layer 130 may be formed to accommodate the functions of these three different regions. Further, the silicon layer 130 may be replaced by a layer of another semiconductor material as well. Such materials may include, for example, indium-phosphide (InP), gallium-arsenide (GaAs), and InGaAsP.

The dielectric waveguide 150 may be formed to overlap the first region of the silicon layer 130. The dielectric waveguide 150 may be made of silica, SiON, $Si_3N_4$, polymers, benzo-cyclobutene (BCB), etc. The dielectric waveguide 150 may be connected to or integrated with various known passive photonic circuits.

The germanium device 160 may be formed by patterning germanium deposited on the silicon layer 130 or by selective growth of germanium in patterned openings on the silicon layer 130. Such germanium devices 160 may be photodetectors, modulators, switches, etc. The photodetectors may be, for example, a PIN or avalanche photodetector. Because germanium and silicon have similar crystalline structures, high quality germanium devices 160 may be formed on a silicon layer 130. Further, a layer of SiGe may be formed on the silicon layer before the germanium layer is formed. The SiGe layer may provide a transition from the silicon crystal structure to the germanium crystal structure. Further, this layer may have a thickness of about 10 nm to 50 nm.

The monolithic integrated optical device 100 may operate as follows. Light from passive photonic circuits may be propagated by the dielectric waveguide 150 to the silicon layer 130. The light may couple from the dielectric waveguide 150 into the silicon layer 130 that may act as a semiconductor waveguide. The light in the silicon layer 130 may propagate to the germanium device 160. When the germanium device 160 is a photodetector, the germanium device may detect the light from the silicon layer 130 and may produce an output electrical signal indicating the presence and characteristics of the optical signal detected.

The monolithic integrated optical device 100 may be formed as follows. First, a silicon layer 130 on a SOI wafer 140 may be patterned. Next, a dielectric waveguide 150 may be formed on the SOI wafer, with a portion of the dielectric 150 overlapping a portion of the silicon layer 130. Finally, a germanium device 160 may be formed on the silicon layer 130 by depositing and patterning a germanium layer on the silicon layer 130 or by selective growth of germanium in patterned openings on the silicon layer 130. Further, an intermediate layer of SiGe may be formed on the silicon layer 130 prior to the formation of the germanium layer.

Figure 2:
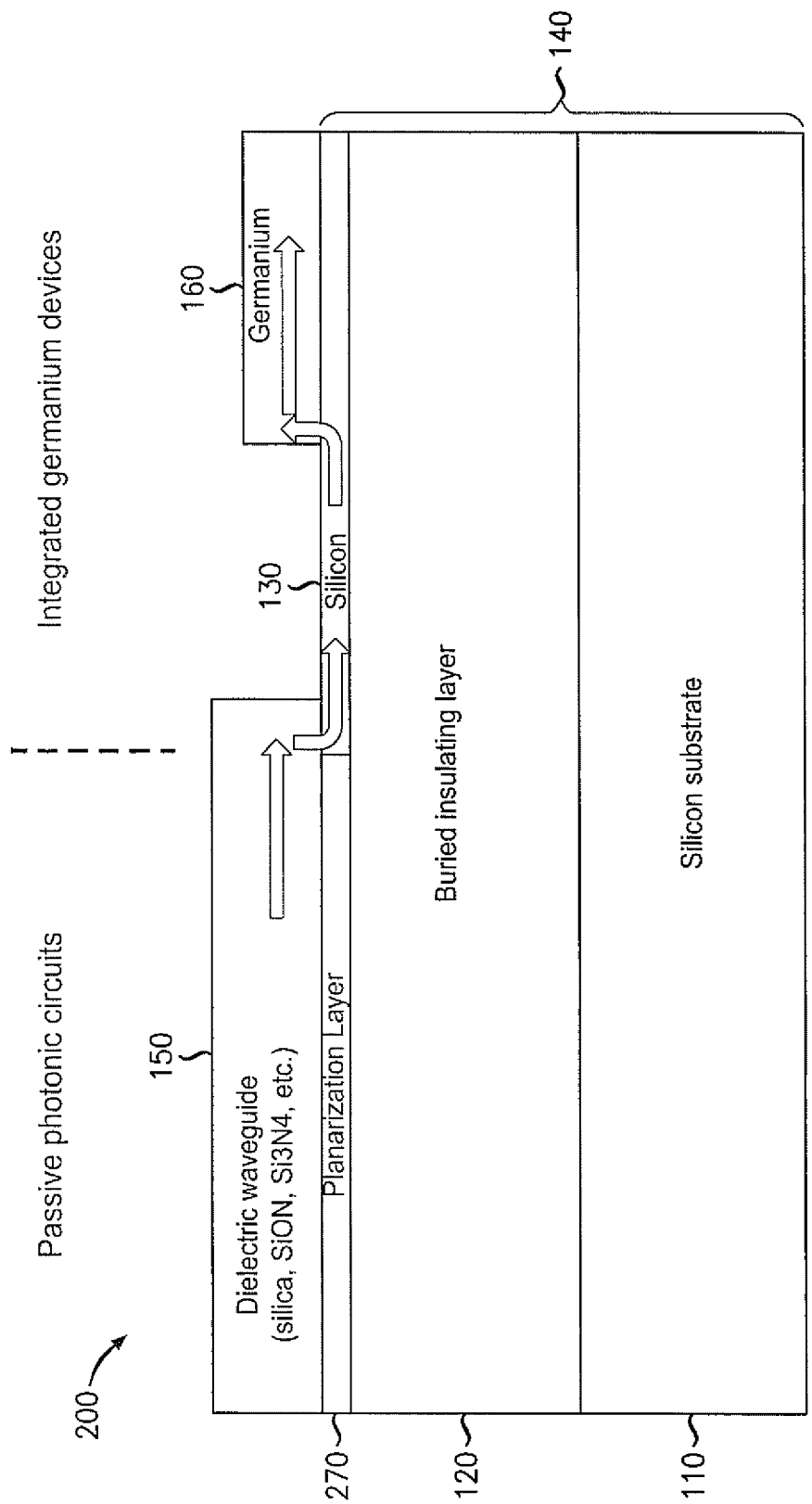
FIG. 2 illustrates a cross-sectional view of another embodiment of a monolithic integrated optical device including a dielectric optical waveguide coupled to a germanium-based device.

FIG. 2 illustrates a cross-sectional view of another embodiment of a monolithic integrated optical device including a dielectric optical waveguide coupled to a germanium-based device. A monolithic integrated optical device 200 is the same as the monolithic integrated optical device 100 in FIG. 1 except for the addition of the planarization layer 270. The planarization layer 270 may be between the dielectric waveguide 150 and the buried insulating layer 120. The planarization layer 270 may have approximately the same thickness as the silicon layer 130. The planarization layer 270 in combination with the silicon layer 130 forms a substantially flat surface upon which the dielectric waveguide 130 may be formed. The use of the planarization layer 270 may remove the vertical boundary between the dielectric waveguide 150 and an edge of the silicon layer 130, thus reducing reflections and scattering of light at the boundary between the dielectric waveguide 150 and the silicon layer 130.

The planarization layer 270 may be formed by deposition and patterning after the silicon layer 130 is formed. After the formation of the planarization layer 270, the dielectric waveguide 150 may be formed on the planarization layer 270 and the silicon layer 130.

Figure 3:
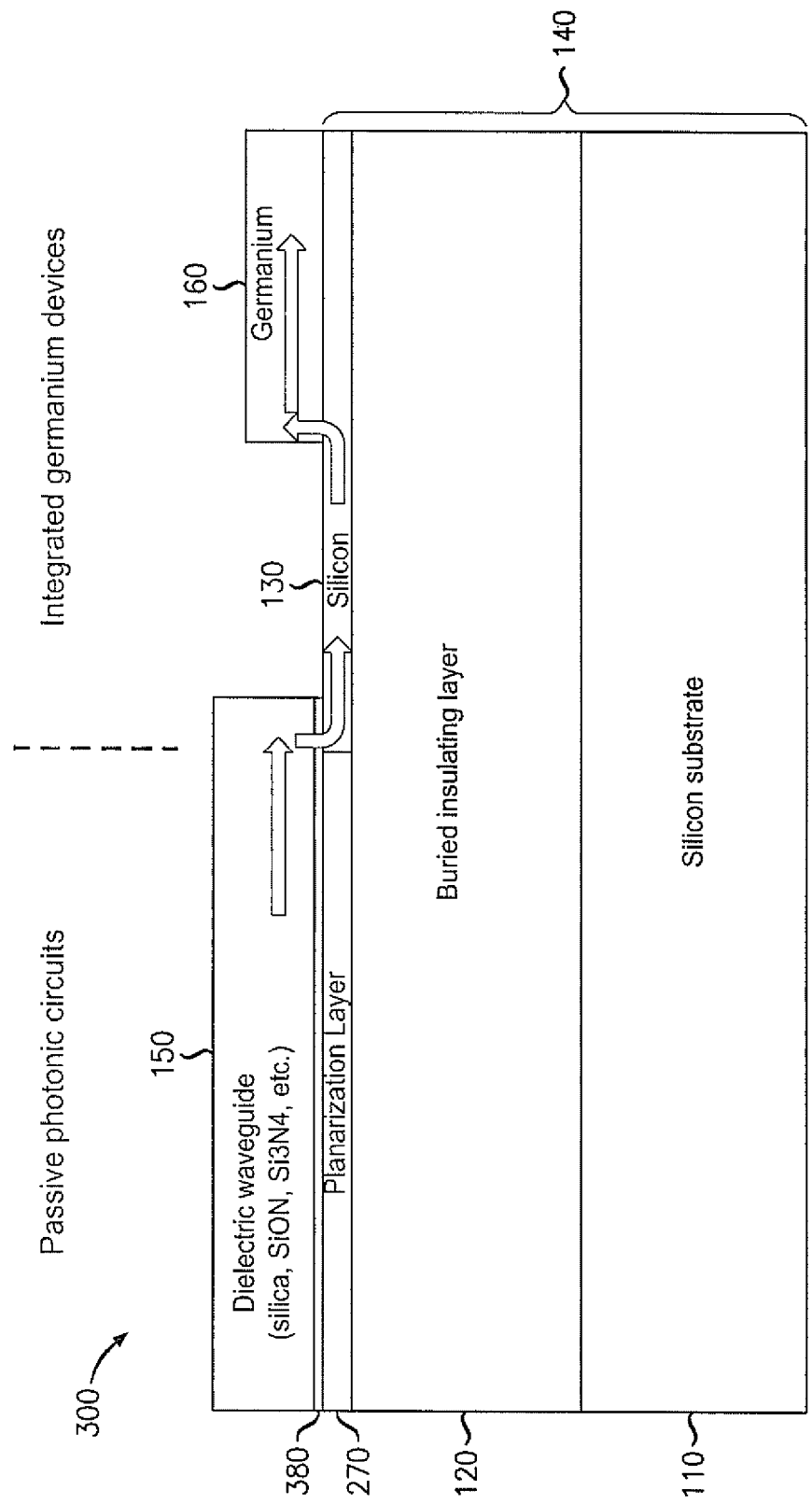
FIG. 3 illustrates a cross-sectional view of another embodiment of a monolithic integrated optical device including a dielectric optical waveguide coupled to a germanium-based device.

FIG. 3 illustrates a cross-sectional view of another embodiment of a monolithic integrated optical device including a dielectric optical waveguide coupled to a germanium-based device. A monolithic integrated optical device 300 is the same as the monolithic integrated optical device 200 in FIG. 2 except for the addition of a spacer layer 380. The spacer layer 380 may be between the dielectric waveguide 150 and the combination of the planarization layer 270 and the silicon layer 130. The spacer layer 380 may help to reduce optical scattering and reflections at the boundary between the dielectric waveguide 150 and the silicon layer 130. Further, the spacer layer 380 may be used to protect the silicon layer 130 during the processing of the dielectric waveguide 150.

The spacer layer 380 may be formed on the surface of the planarization layer 270 and the silicon layer 130. Then the dielectric waveguide 150 may be formed on the spacer layer 380. Next, the exposed spacer layer 380 over the silicon layer 130 may be removed, and then the germanium device 160 may be formed as described above with respect to FIG. 1.

The thickness of the spacer layer 380 may be selected to optimize the optical coupling. It should be noted that as the thickness of the spacer increases, the amount of optical scattering/reflections at the boundaries may decrease. The thickness of the spacer may be less than 200 nm, may be less than 100 nm, or may be about 100 nm. The spacer may be made of any material that passes the optical signal with a minimal loss and/or that has an index of refraction lower than either the dielectric waveguide 150 or the silicon layer 130. For example, suitable materials may include one of $SiO_2$, SiON, $Si_3N_4$, and benzocyclobutene (BCB). In some cases, the spacer may be of the same material as the planarization layer, and may be deposited together with the planarization layer. In some cases, the spacer can be of a different material than the planarization layer and may be deposited separately.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be effected while remaining within the spirit and scope of the invention. Accordingly, the foregoing disclosure, description, and figures are for illustrative purposes only and do not in any way limit the invention, which is defined only by the claims.

What is claimed is:

1. An integrated optical device comprising:
    a semiconductor waveguide on a substrate;
    a planarization layer on the substrate;
    a dielectric waveguide on the substrate optically coupled to the semiconductor waveguide, wherein the dielectric waveguide overlaps the planarization layer and a portion of the semiconductor waveguide; and
    a germanium device on the semiconductor waveguide optically coupled to the semiconductor waveguide.

2. The integrated optical device of claim 1, wherein the semiconductor waveguide is single crystal silicon.

3. The integrated optical device of claim 1, wherein the planarization layer has a thickness approximately the same as a thickness of the semiconductor waveguide.

4. The integrated optical device of claim 3, further comprising:
    a spacing layer between the dielectric waveguide and the planarization layer and between the dielectric waveguide and the semiconductor waveguide.

5. The integrated optical device of claim 4, wherein the spacing layer is part of the planarization layer.

6. The integrated optical device of claim 1, further comprising:
    a buried insulating layer on the substrate, wherein the substrate is silicon.

7. The integrated optical device of claim 6, wherein the silicon substrate, the buried insulating layer, and the semiconductor waveguide comprise a silicon-on-insulator (SOI) wafer.

8. The integrated optical device of claim 1, wherein the germanium device is a photodetector.

9. The integrated optical device of claim 1, wherein the germanium device is a modulator.

10. The integrated optical device of claim 1, wherein the germanium device is a switch.

11. The integrated optical device of claim 1, wherein the dielectric waveguide is coupled to a passive photonic circuit.

12. The integrated optical device of claim 1, wherein the dielectric waveguide is one of silica, SiON, $Si_3N_4$, and benzocyclobutene.

13. A method of forming an integrated optical device comprising:
    patterning a silicon layer on a silicon-on-insulator (SOI) wafer;
    forming a planarization layer on the SOI wafer after patterning the silicon layer;
    forming a dielectric waveguide on a substrate optically coupled to the silicon layer, wherein the dielectric waveguide overlaps the planarization layer and a portion of the silicon layer; and
    forming a germanium device on the silicon layer optically coupled to the silicon layer.

14. The method of claim 13, wherein the silicon layer is single crystal silicon.

15. The method of claim 13, wherein the planarization layer has a thickness approximately the same as a thickness of the silicon layer.

16. The method of claim 15, further comprising:
    forming a spacing layer on the planarization layer and the semiconductor waveguide before forming the dielectric waveguide.

17. The method of claim 13, wherein the germanium device is a photodetector.

18. The method of claim 13, wherein the germanium device is a modulator.

19. The method of claim 13, wherein the germanium device is a switch.

20. The method of claim 13, wherein the dielectric waveguide is coupled to a passive photonic circuit.

21. The method of claim 13, wherein dielectric waveguide is one of silica, SiON, $Si_3N_4$, and benzocyclobutene.

* * * * *